Jan. 14, 1969  S. A. COLLINS, JR  3,422,370

VARIABLE FREQUENCY LASER

Filed July 19, 1965

INVENTOR.
STUART A. COLLINS JR.
BY

*John H. Gallagher*

ATTORNEY

United States Patent Office 3,422,370
Patented Jan. 14, 1969

3,422,370
VARIABLE FREQUENCY LASER
Stuart A. Collins, Jr., Columbus, Ohio, assignor to Sperry Rand Corporation, Great Neck, N.Y., a corporation of Delaware
Filed July 19, 1965, Ser. No. 473,005
U.S. Cl. 331—94.5    4 Claims
Int. Cl. H01s 3/10

ABSTRACT OF THE DISCLOSURE

A variable frequency laser including a high Q electro-optic interferometer positioned in a low Q laser resonator, the reflectivity of the reflective surfaces forming the resonator being less than the reflectivity of the interferometer surfaces and proportioned in accordance with the optical length of the resonator to provide stimulated emission over a given continuous frequency range whereby the output frequency of the laser may be varied in a continuous manner by changing the voltage applied to the electro-optic interferometer.

---

This invention relates to a frequency tunable laser, and more particularly relates to a laser device which is capable of emitting coherent light at substantially any selectable frequency throughout a continuous frequency range whose limits are the lowest and highest frequencies at which the device is capable of emitting coherent light.

The active materials of lasers may be stimulated to produce coherent light emission over some given range of frequencies, this range of frequencies being known as the fluorescent linewidth of the material. However, because most laser active materials are located within an optical resonator which has discrete narrow bandwidth resonant frequencies that are spaced apart in frequency by the value $C/2L$, where C is the free space velocity of light, and L is the optical length of the resonator, the light output of the laser is confined to the plurality of discrete narrow resonant frequencies of the optical resonator.

In copending application S.N. 267,591, now U.S. Patent 3,358,243, entitled Laser Having Interferometer Controlled Oscillatory Modes, filed Mar. 25, 1963 in the names of Stuart A. Collins, Jr., and George R. White, and assigned to applicant's assignee, it is taught that the emitted light from a laser can be confined to one of the discrete narrow resonant frequencies of the laser resonator by placing an arrow bandwidth interferometer within the resonator. Because optical resonators customarily are comprised of spaced mirrors having reflectivities of around .99, the resonant frequencies of the resonator are narrow in bandwidth and there is no overlap between the resonances. Consequently, any attempt to vary the frequency of the light output of the laser by changing the resonant frequency of the interferometer that is included within the resonator would result in discrete jumps in the frequency of the output light from one resonant frequency to another. As a result, smooth and continuous tuning of the laser output signal, or continuous frequency modulation of the laser output signal, would be impossible.

It therefore is an object of this invention to provide a laser whose output signal is confined to a very narrow frequency band, and whose output frequency may be continuously varied throughout the fluorescent linewidth of the active material of the laser.

Another object of this invention is to provide means for frequency modulating a laser.

In accordance with the illustrated embodiment of the invention the laser active material is disposed within an optical resonator comprised of end mirrors which, in accordance with the novel aspects of this invention, have uncommonly low reflectivities so that the resonator has a relatively low optical Q for a laser resonator. The length of the resonator is chosen so that it is resonant at a plurality of relatively closely spaced frequencies that fall within the fluorescent linewidth of the active material, and the Q of the resonator, i.e., the reflectivity of the resonator mirrors, is proportioned so that the plurality of resonances are broad and overlap to an appreciable extent so that the laser is capable of producing stimulated emissions substantially continuously throughout the fluorescent linewidth of the material. A narrow band interferometer is placed within the laser resonator and restricts the frequency of the light emitted from the laser material to a narrow bandwidth commensurate with that of the interferometer. By changing the optical distance between the reflecting mirrors of the interferometer the resonant frequency of the interferometer will be changed, and because the frequency of the light emission from the active material is controlled by the interferometer the frequency of the emitted light from the laser is changed. The optical distance between the interferometer mirrors may be varied by a mechanical means, by an electromechanical means such as a piezoelectric crystal, or by use of electro-optic or magneto-optic material. Because the resonance responses of the laser resonator are broad and overlapping, the laser will continuously produce stimulated emissions as the resonant frequency of the interferometer is varied throughout the frequency range of the fluorescent linewidth of the active material.

The invention will be described by referring to the accompanying drawings wherein.

Figure 1:
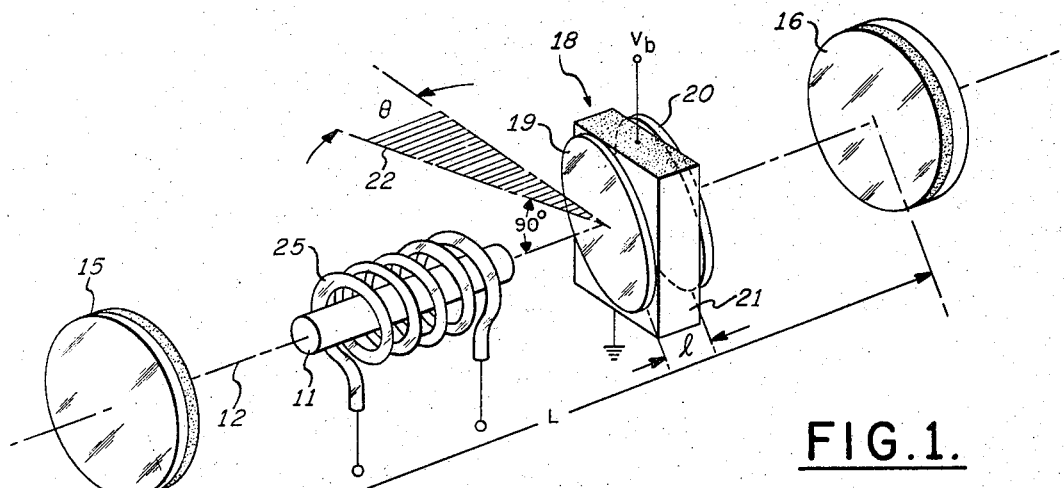
FIG. 1 is a simplified illustration of the basic components of a laser constructed in accordance with the teachings of this invention.

Referring now in detail to FIG. 1, the active material of the laser is illustrated as a rod 11 of ruby crystal that is located along the optical axis 12 between the end mirrors 15 and 16 which define the ends of the laser optical resonator. An interferometer 18 is located within the optical resonator and is comprised of the spaced, parallel mirrors 19 and 20 which are centered along optical axis 12 and are inclined at an angle $\theta$ to the line 22 that is normal to the axis. Interferometer 18 thus comprises a Fabry-Perot etalon whose mirrors are inclined to the optic axis to reduce the frequency content and the beamwidth of the emitted light, as taught in the above-mentioned copending application S.N. 267,591. A crystal 21 of an electro-optic material such as potassium dihydrogen phosphate (KDP) is positioned between interferometer mirrors 19 and 20, and a source of potential $V_b$ is coupled to electrodes on opposite faces thereof to provide means for varying the index of refraction of the crystal and thus vary the optical distance $l$ between the faces of mirrors 19 and 20.

The ruby rod 11 is excited or "pumped" by a conventional flash tube 25 to an energy level above its metastable energy level, the coherent radiative decay taking place from the elevated energy level. It should be understood that the present invention is not restricted in its application to a ruby laser, but this invention is equally useful in lasers employing other types of active materials such as gases, dielectric crystals, and semiconductors diodes, for example.

Figure 2:
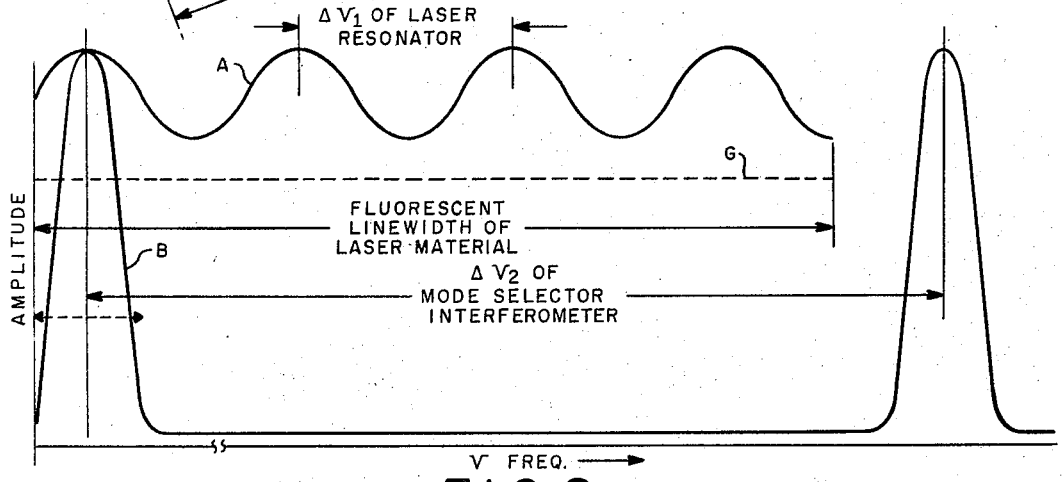
FIG. 2 is a series of curves used to help explain the operation of the device of FIG. 1.

The laser resonator, whose optical length is defined by the spacing L between end mirrors 15 and 16, will support coherent light oscillations at a plurality of frequencies, the waves at each frequency having an integral number of half wavelengths within the spacing L. A laser resonator with a length of 46 centimeters, for example, resonates at a plurality of frequencies separated by approximately 325 megacycles, this frequency separation being referred to as the spectral free range ($\Delta v_1$) of the laser. Since the fluorescent linewidth of the ruby emission is approximately 325 gigacycles, the laser resonator ordinarily would support the quotient of $325 \times 10^9$ and $325 \times 10^6$, or approximately 1000 resonant frequencies. In the lasers constructed in the past, the laser optical resonators have had high Q's, that is, the end mirrors had high reflectivities that ranged between approximately .90 and .99. This caused each of the laser resonant frequencies to be separate and distinct and the laser did not emit light at frequencies intermediate the plurality of distinct resonant frequencies. Because of this, the frequencies to which a laser could be tuned to oscillate were confined only to those discrete frequencies separated by the spectral free range, and the laser could not be continuously tuned or swept in frequency over any appreciable frequency range because it would skip between the resonant frequencies of the optical resonator and would not lase at frequencies in between. By applying the teachings of this invention it is possible for the laser to emit coherent light at substanially any frequency within the lasing range of the fluorescent linewidth of its active material, and by employing the interferometer 18 within the laser optical resonator the coherent light actually emitted by the laser is confined to a relatively narrow frequency range that is determined by the frequency response characteristics of the interferometer 18. The described type of operation is accomplished by making the reflectivity of the laser end mirrors 15 and 16 relatively lower than the reflectivity that is commonly employed in prior art lasers and lower than the reflectivity of the end mirrors 19 and 20. The curve A of FIG. 2 illustrates the frequency response of only the laser optical resonator, this type of frequency response curve being essential to practice the present invention. In actual practice, such a curve would have many more peaks than illustrated, but for simplicity and clarity of illustration only a few have been shown. As may be seen, the curve A is continuous and of a finite value throughout the fluorescent linewidth of the material, and everywhere within this frequency it is above the level G which is necessary for oscillations to be sustained by the laser, it being assumed at this point that the laser is functioning as an oscillator. This condition is achieved by having the reflectivity $R_1$ of end mirrors 15 and 16 low enough to satisfy the following relationship $$\frac{1}{g} \leq \frac{1}{1+\left(\frac{2\sqrt{R_1}}{1-R_1}\right)^2}$$

where $g$ is the gain of the laser.

The actual light output of the laser material, however, is confined to a frequency band determined by the resonant frequency of interferometer 18 (curve B of FIG. 2), whose mirrors 19 and 20 each has a reflectivity $R_2$ that is higher than the reflectivity $R_1$ of laser end mirrors 15 and 16. That is, interferometer 18 functions in a manner analogous to a frequency selective filter which causes the laser active material to emit coherent light only within the frequency range of that part of the transmission peak of curve B, FIG. 2, which exceeds the level defined by the horizontal line G. The spectral free range ($\Delta v_2$) of the interferometer 18 is as illustrated by the curve B in FIG. 2 and is so chosen that only one of its transmission peaks at a time falls within the fluorescent linewidth of the laser material. The type of spectral free range illustrated by curve B of FIG. 2 is produced by assuring that mirrors 19 and 20 of interferometer 18 as close together in terms of optical wavelengths. The resonant frequencies of interferometer 18 are determined by the optical distance $l$ between mirrors 19 and 20. A transmission peak of curve B of FIG. 2 may be positioned anywhere throughout the frequency range of the fluorescent linewidth of the laser active material by choosing the appropriate optical spacing $l$ between interferometer mirrors 19 and 20. This may be accomplished by placing the electro-optic material 21 between the mirrors 19 and 20 and varying the biasing potential $V_b$ to change the index of refraction of the electro-optic material to obtain a desired value of $l$. This also could be accomplished by varying the physical separation between mirrors 19 and 20 by some mechanical mechanism. Additionally, the optical distance $l$ between mirrors 19 and 20 may be varied by employing a different type of variable index of refraction material such as a magneto-optic material, or the physical spacing $l$ may be changed by means of a piezoelectric crystal attached to one or both of the mirrors 19 or 20. In this manner the frequency of the emitted light from the laser may be set to substantially any selected frequency within the fluorescent linewidth of the material, and by continuously varying the optical separation $l$ between mirrors 19 and 20 the laser light output may be modulated in frequency to produce a substantially continuously varying frequency output. As the laser is tuned through the regions of minimum amplitude of curve A, these regions corresponding to frequencies intermediate the optimum resonant modes of the optical resonator formed by end mirrors 15 and 16, there may be some slight frequency skip in the continuous frequency tuning of the laser. This results from the laser oscillations changing from one laser resonator mode to the next adjacent one. This causes the frequency of the light to jump from one side of the mode selector passband to the other. This effect will be slight, however, and of negligible effect when the mirrors 19 and 20 are of high reflectivity to produce a narrow passband for mode selector etalon 18.

Figure 3A:
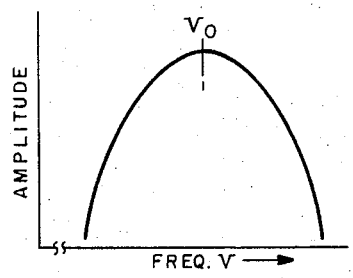
FIGS. 3a and 3b are curves that help explain the desirable operating characteristics of the device of this invention.
Figure 3B:
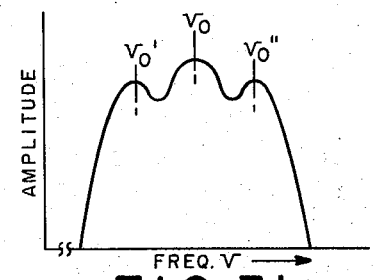

Caution must be exercised to assure that the combined frequency responses of the laser optical resonator and the frequency determining interferometer 18 produce a resultant single-peaked characteristic for the composite output signal, this type of characteristic being illustrated by the curve in FIG. 3a. With this type of characteristic the frequency of the emitted light will be stable at the selected frequency $v_0$. If, however, the resultant frequency response characteristic of the laser optical resonator and the interferometer 18 is a multiple-peaked characteristic of the type illustrated by the curve in FIG. 3b, the frequency of the emitted light might possibly be at any one of the frequencies, $v_0$, $v_0'$, or $v_0''$, and/or might shift between these peaks in a random manner, thus causing the frequency characteristic of the laser to be unstable. The condition illustrated in FIG. 3b may be avoided by assuring that the slope of the frequency response curve of the interferometer 18, curve B of FIG. 2, is greater than the slope of the laser optical resonator, curve A of FIG. 2. The single-peaked characteristic illustrated in FIG. 3a will be assured by proportioning the various parameters of the laser to satisfy the following relationship $$\frac{2R_1}{(1-R_1)^2} \cdot \frac{(1-R_2)}{\sqrt{3}\sqrt{R_2}} \leq \frac{\eta_2 l}{\eta_1 L}$$

where $R_1$ and $R_2$ are the reflectivities of laser end mirrors 15, 16 and interferometer mirrors 19, 20, respectively; $\eta_1$ and $\eta_2$ are the indices of refraction of the media of the laser optical resonator and interferometer, respectively, and L and $l$ are the optical lengths of the laser optical resonator and interferometer, respectively. In a practical situation involving a ruby laser, the ratio $l/L$ would be of the order of .02 and the reflectivities $R_1$ and $R_2$ would be approximately .2 and .9, respectively.

The device illustrated in FIG. 1 also may be operated as a light amplifier by maintaining the gain $g$ below unity. In the claims that follow the term laser is intended to include devices operating both as oscillators and as amplifiers.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:
1. A laser comprising
   an optical resonator formed by spaced reflective surfaces,
   a laser material within the resonator for producing a beam of coherent light along an axis within the resonator, and
   interferometer means positioned in the resonator along said axis,
   the reflective surfaces of the resonator having reflectivities which are lower than those of reflective surfaces of the interferometer and proportioned in accordance with the optical length of the resonator to enable the resonator to support oscillations at a sufficient magnitude over a sufficient frequency range to induce stimulated light emissions from said laser material over a given continuous range of light frequencies that includes a plurality of frequencies at which said resonator is an integral number of half wavelengths long.

2. A coherent light source tunable in frequency over a relatively broad and continuous frequency range comprising,
   a light resonator comprised of first and second spaced reflective surfaces,
   a light source in said resonator capable of producing coherent oscillations of electromagnetic waves over a continuous range of light frequencies that includes a plurality of frequencies at which said resonator is an integral number of half wavelengths long,
   the optical length of said light resonator and the reflectivities of said first and second reflective surfaces being proportioned to support oscillations of light at a sufficient magnitude over a sufficient continuous frequency range to induce stimulated light emission from said light source over said continuous range of light frequencies, and
   a plurality of frequencies at which said resonant said interferometer having spaced reflecting surfaces whose reflectivities are higher than those of said first and second reflective surfaces, and
   means for varying the frequency selectivity of said interferometer within said continuous range of light frequencies.

3. A coherent light source tunable in frequency over a relatively broad and continuous frequency range comprising,
   first and second spaced reflective surfaces defining an optical resonator,
   a laser light source within said resonator capable of emitting coherent light over a given continuous frequency range,
   the spacing of said reflective surfaces being an integral number of half wavelengths at a plurality of frequencies within said given continuous frequency range,
   the reflectivities of said reflective surfaces and their spacing being proportioned to support oscillations of light at sufficient magnitude over a sufficient continuous frequency range to induce stimulated emission from said light source over said given continuous frequency range,
   frequency selective light transmission means disposed between said first and second reflective surfaces, said frequency selective means comprising third and fourth spaced light reflecting surfaces having reflectivities higher than those of said first and second reflective surfaces and having a single frequency pass band that falls within but is narrower than said given frequency range, and
   means for varying the frequency selectivity of said light transmission means within said given frequency range.

4. The combination claimed in claim 3 wherein the parameters of the combination are proportioned according to the relationship $$\frac{2R_1}{(1-R_1)^2} \cdot \frac{(1-R_2)}{\sqrt{3}\sqrt{R_2}} \leq \frac{\eta_2 l}{\eta_1 L}$$

where $R_1$ and $R_2$, $l$ and $L$, and $\eta_1$ and $\eta_2$ are, respectively, the reflectivities, the optical spacings between, and the indices of refraction of the media between, the first and second, and the third and fourth light reflecting surfaces.

References Cited
UNITED STATES PATENTS 3,327,243 6/1967 Stickley _____ 331—94.5
3,358,243 12/1967 Collins et al. _____ 331—94.5

JEWELL H. PEDERSEN, *Primary Examiner.*

R. Y. WIBERT, *Assistant Examiner.*

U.S. Cl. X.R.

88—14